March 5, 1968     L. F. SAMLER ET AL     3,371,912

RECIRCULATING PARTICULATE SOLIDS BLENDER

Filed Jan. 5, 1967

INVENTORS
LEE F. SAMLER
EVAN V. BRIGGS

BY   KARL W. FLOCKS

ATTORNEY

3,371,912
RECIRCULATING PARTICULATE SOLIDS BLENDER

Lee F. Samler, Baltimore, and Evan V. Briggs, Millersville, Md., assignors to National Plastic Products Company, Inc., Odenton, Md., a corporation of Maryland
Filed Jan. 5, 1967, Ser. No. 607,542
7 Claims. (Cl. 259—4)

ABSTRACT OF THE DISCLOSURE

The present disclosure relates to a recirculating blender for particulate solids and, more particularly, to a system for the blending of particulate solids which has large capacity and versatility and is particularly useful in the blending of plastic materials and additives, such as pigments, pigmented pellets, stabilizer and/or plasticizer concentrates. A blender having compartments in parallel is provided having recirculating conveying means so that solid particles can be recirculated from the bottom of all the compartments simultaneously to the top of one of the compartments along with fresh feed for a given period of time, and then shifted to the top of another compartment to provide sequential feeding to each compartment while there is provided simultaneous discharge from all compartments.

Background

Figure 1:
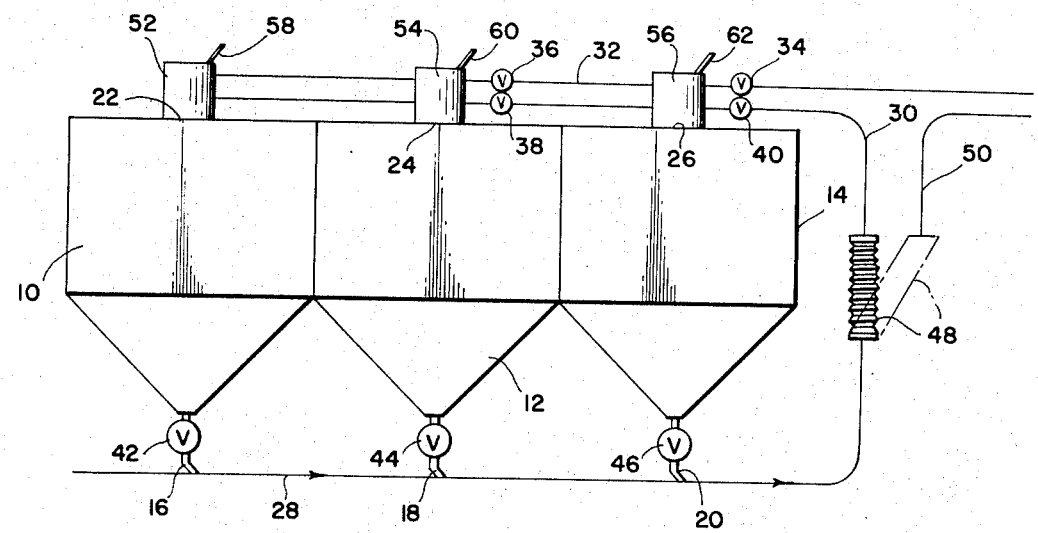

In the prior art it has been known to homogenize or blend a large quantity, for example in excess of 10,000 pounds, of a heterogenous mass of particulate flowable solids by establishing a vertical bed of such solids and withdrawing such solids from various locations along the height of such vertical bed, mixing the various heterogeneous solids withdrawn and then re-conveying such mixture back to the upper level of the vertical bed. This principle has found many applications, particularly in the chemical industries, wherein a product is produced over an extended period of time and the variations in the process result in relatively minor, but detectable, variations in the properties of the final product. Devices utilizing such principle to an extent are shown in the patents to Wilson No. 455,082; Arthur et al. No. Re. 25,687; Seifarth No. 3,158,362; and Goins No. 3,216,629. When the particulate material is stored in a large bin, tank or silo, the properties of the solids withdrawn from one level in such vessels will be significantly different from the properties of a portion withdrawn from another level. This strata variation tends to complicate the obtention of particular solids at any given moment having desired properties or specifications. The devices of the prior art, while highly useful in a number of operations, have not entirely solved these problems.

Such devices of the prior art also suffered from other defects. Thus, where it is desirable to use the same homogenizing or blending apparatus to blend different materials at different times, it may be necessary to meticulously clean the blending device between uses. This is particularly true where large quantities, e.g., on the order of tens of thousands of pounds, of powedered, pelleted or chips of material are to be blended, since meticulous cleaning must be accomplished as the blending devices are changed from product to product. This problem is particularly actue where it is desired to blend particulate plastic material with pigments; when it is desired to change from one color to another color or changing from a colored material to a clear material, or in any materials where cross-contamination cannot be tolerated, the residual retention or even very small quantities of the first used pigment during the second operation will contaminate the new blend sufficiently to prevent obtention of the desired color. The aforementioned device of prior art, in utilizing internal or external tubes for the withdrawal of particular material at different levels, makes them exceedingly difficult, if not impossible, to adequately clean. Other prior art devices, using internal baffles (Prosser Patent No. 3,066,920) or internal screens (Clark et al. Patent No. 2,991,049) also suffer from this defect and, in fact, such latter machines are even more difficult to clean.

In addition, in order to handle large quantities of material as is often desirable, many of such prior art devices cannot effectively be housed in a single story structure. Their great height not only complicates their construction and location, but further makes them difficult to clean internally because a worker entering such a device to effect cleaning thereof must either take a ladder with him or must somehow be supported internally by another manner. On the other hand, those blending devices which can be housed in a single story structure are complex mechanical devices, allowing only rudimentary access for cleaning.

Furthermore, such prior art devices cannot effectively be operated to blend or homogenizes particulate solids during the charge or discharge cycles of the apparatus. The prior art devices require post-blending after feeding has been completed; thus prior art post-blending, depending on quantity, may require as much time as, for example 12 hours for a 60,000 pound batch.

Summary

It is therefore an object of the present invention to obivate the deficiencies of the prior art, such as those deficiencies indicated above.

It is another object of the present invention to provide a large capacity blending apparatus which may be easily cleaned and which may be located in a single story structure.

It is another object of the present invention to continuously blend large quantities of particulate solids during the feeding and discharge cycles without the requirement of post blending after feeding has been completed.

It is another object of the present invention to provide a new and improved blending apparatus of high storage capacity and limited height for inside installation.

It is another object of the present invention to provide a system of high capacity blending utilizing easy-to-clean vessels.

It is another object of the present invention to provide a blending apparatus which eliminates the need for blending tubes, baffles and/or screens.

It is another object of the present invention to provide a system utilizing infinitely variable compartment-to-compartment flow of material by which blending of such material is possible without the added delay of recycling after feeding has been completed.

It is another object of the present invention to provide a system utilizing more than one compartment and discharging devices to provide interblending during the discharge cycle.

An apparatus for blending particulate solids in accordance with the present invention may include a plurality of sealed compartments arranged in parallel and adjacent one another, an exit discharge at the bottom of each said compartment, conveyor means for receiving particulate solids from said exits of said compartments, recirculating valve means for selectively (*a*) recirculating particulate solids from said conveyor means and (*b*) discharging particulate solids from said apparatus, an entrance opening at the top of each said compartment, recirculating passage means from said recirculating valve to said entrance openings, fresh feed passage means from a source of fresh supply to said entrance openings, and diverter valve means in said recirculating passage and fresh feed passage to direct the inflow of particulate solids, both fresh feed and recirculated material, into one of said compartments.

These and other objects and the nature and advantages of the present invention will be more apparent from the following detail taken in conjunction with the drawings, wherein:

*Drawings*

Figure 2:
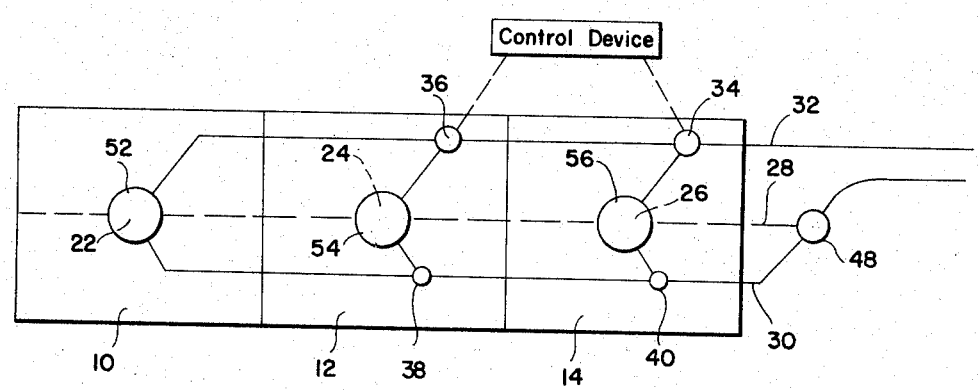

FIG. 1 is a schematic front elevation of an apparatus in accordance with the present invention; and FIG. 2 is a schematic plan view of an apparatus similar to that of FIG. 1.

*Detailed description*

A blending apparatus in accordance with the present invention includes a multi-compartment unit in which the compartments are arranged in parallel in the recirculating system. Thus, in the devices of FIGS. 1 and 2, the blender comprises three parallel compartments or vessels 10, 12 and 14, respectively, being equipped with a discharge or exit 16, 18 and 20 at the bottoms thereof. At the top of each compartment there is provided an entrance opening 22, 24 and 26, respectively.

The apparatus is provided with a conveyor system 28 which picks up the particulate solid material exiting at the base of each compartment from the discharges 16, 18 and 20 and recirculates such solid particulate material to a recirculating passage 30 whereby the recycled particulate solids are mixed with fresh feed at the air entrance openings, such fresh feed brought into the system through a fresh feed passage 32.

Generally, the recycled and feed mixture is automatically controlled by a predetermined program and through a control device having suitable instrumentation, so that the compartments are fed consecutively through a system of diverter valves 34, 36, 38 and 40. Of course, during use the diverter valves may be controlled manually if desired. To effect blending, it is generally desirable to withdraw material from all compartments to make up the recycled stream and to feed the recycled material to only one of the compartments as noted in more detail below.

In greater detail, the blending apparatus of the present invention comprises a plurality, such as the three illustrated, compartments 10, 12 and 14 which are arranged in parallel adjacent one another and are sealed, except for the entrance openings and the discharge exits, to prevent any intermixing of contents therebetween. The compartments 10, 12 and 14 are of large capacity, but the height of each unit is limited so that the apparatus may be used in a one-story building or on only one floor of a multi-story building, and also so that the compartments may be internally cleaned by a worker without necessitating the use of ladders, specially constructed internal supports, etc. Each compartment is simple in design and contains no internal baffles, screens or tubes and no outside tubes except for the discharge exit, at the base thereof. It is desirable to have the lower portion of each compartment taper down to the discharge exit thereof to facilitate gravity feeding of all the particulate solids contained in each compartment; such a tapering bottom portion may, for example, be conical.

Preferably placed in each discharge exit 16, 18 and 20, are valves 42, 44 and 46, which may preferably be rotary air locks. Additional control will be had by the provision of such discharge valves although generally in use, material will continually flow in equal amounts from all compartments.

The discharge valves 42, 44 and 46 are preferably variable speed discharge valves so that the rate of particulate material flowing from the compartments may be thereby controlled.

The conveyor means 28 which receives particulate solids from each of the discharge exits 16, 18 and 20 may take any suitable form, for example, it may be a mechanical conveyor or, preferably, it may comprise a tubular conduit in which the particulate solids are driven by pneumatic pressure from a source not shown. At the end of the conveyor means 28 is provided a recirculating valve 48 which may be either a simple three-way valve or, as illustrated, a flexible tube which may be either connected to the recirculating passage 30 or to a system discharge passage 50 which feeds the completely blended material to use or storage.

The recirculating passage 30 and the fresh feed passage 32, like the conveyor 28, may be either mechanical conveyors or they may comprise simply conduits in which the particulate material is driven therethrough by pneumatic means. Although shown as separate passages, it should be understood that passages 30 and 32 may empty into a common conduit which then passes adjacent the compartment entrance openings 26, 24 and 22; in such a case, only half as many diverter valves 34–40 would be needed.

Since the particulate material in the passageways 30 and 32 are preferably driven by pneumatic means, it is desirable to provide a solids-gas separator adjacent the entrance opening of each compartment. Thus, a solids-gas separator, such as a cyclone separator 52, 54 and 56 may be placed adjacent each entrance opening 22, 24 and 26, respectively, and the air-particulate solids mixture from passages 30 and/or 32 will be fed to such gas-solids separator so that only the solids will fall into the compartments 10, 12 and 14 while the air escapes through suitable openings 58, 60 and 62.

The diverter valves 36–40, themselves, may be simply automatically controlled three-way valves which direct the flow of particulate solids into the desired compartment. Noting FIG. 2, it may be seen that fresh feed entering through passageway 32 may be controlled by diverter valve 34 to flow either into the separator 56 or to second diverter valve 36. Similarly, the second diverter valve 36 may permit flow of solids either into the separator 54 or the separator 52. For the recirculating solids passing through passageway 30, the diverter valves 40 and 38 operate in similar manner and, as with the valves 34 and 36, are preferably automatically controlled through a predetermined program. Because the second diverter valve 36 (or 38) directs the flow of particulate solids to either compartment 10 or compartment 12, it is clearly seen that one fewer diverter valve is needed than the number of compartments, for each feed passageway; and in the case where passages 30 and 32 feed to a common conduit, the number of diverter valves will be one fewer than the number of compartments.

In operation, the compartments are sequentially fed on an incremental time basis controlled by the control device activating the diverter valves through pneumatic or electric lines, as desired. Particulate material is continuously circulated, and fresh feed is added until a sufficient quantity of fully blended material is obtained, after which the closed circuit is opened to the discharge line 50 through the recirculating valve 48 so that the fully blended material may be discharged from the compartments to storage or to use.

The following example is illustrative, but not limitative, of the present invention.

The blending apparatus is continuously fed with fresh feed through line 32 into the air-solids separator 52 at rates from 1000–3000 pounds per hour. Such particulate material may come directly from a plastics pelletizer as is known in the art. At the same time such fresh particles are fed to the compartment 10 through the line 32, other particulate material is recirculated pneumatically through line 30 with each compartment yielding one-third of the recycled stream through its respective discharge exit to the conveyor 28. The fresh feed and the recycled stream is mixed together in the air-solids separator 52 and falls into the compartment 10.

The recycled sequence, preferably controlled by timers in the control device, may preferably maintain flow to the compartment 10 for from 1–30 minutes. At the end of such period, the diverter valves are switched so that flow is then directed to the compartment 12, the mixture of fresh feed and recycled feed taking place in the solids-gas separator 54, the recycled flow being 15,000 pounds per hour compared to the fresh feed flow of 1,000–3,000 per hour. The 15,000 pounds per hour recycle comprises 5,000 pounds per hour from each of the three compartments.

After another time increment, e.g., 20 minutes, the diverter valves are switched again so that the flow of particulate solids is directed to compartment 14 in the same way as it was previously directed to compartments 10 and 12, respectively. After compartment 14 has received the flow of particulate solids, both fresh and recirculated, for the same increment of time as compartments 10 and 12 before it, the diverter valves are again switched so that the flow is returned to compartment 10 again. This sequence is repeated continuously until the blender is at full or near capacity, at which time the recirculating valve 48 is moved so that the material can be removed from the system through line 50. Even when the material is being discharged through line 50, the stream of particulate material is still made up of equal parts of solids from the separate compartments, thus giving additional blending throughout the discharge cycle.

The blending system here dsclosed has a number of advantageous features, including:

(1) It may be very easily cleaned after use which is of particular value to eliminate cross contamination between different batches of materials desired to be mixed.

(2) It may be charged with a multiple component batch without requiring pre-mixing. While loading without pre-mixing has been acceptable in very small machines such as double cone blenders, ribbon mixers, etc., blenders for handling large batches have not had this feature of eliminating pre-mixing for multiple components because size of such equipment would be cumbersome and prohibitively expensive.

(3) It may be housed in a single-story structure and yet has a high capacity of tens of thousands of pounds of material.

(4) It may be meticulously cleaned by entry of a workman or by a long-handled vacuum wand or brush, since the interior of the apparatus is void of internal tubes, baffles, screens or apertures for external blending tubes; and the extremities of the apparatus may be reached with common cleaning devices.

(5) During operation the system serves to blend and homogenize the components both while the device is being filled and while the blended material is being discharged therefrom.

(6) It may be immediately discharged of its contents after the fill cycle has been completed and without a subsequent interval for blending after charging of fresh material.

(7) It may be simply and easily programmed, or operated by hand, to give various amounts or degrees of blending.

(8) It obviates the previously required use of internal or external blending tubes, baffles, or screens.

It will be obvious to those skilled in the art that various changes may be made without departing from the scope of the invention and the invention is not to be considered limited to what is shown in the drawings and described in the specification.

What is claimed is:

1. Apparatus for the blending of particulate solids, comprising:

a plurality of sealed compartments arranged in parallel and adjacent one another;

an exit discharge at the bottom of each said compartment;

conveyor means for receiving particulate solids from said exits of said compartments;

recirculating valve means for selectively (a) recirculating particulate solids from said conveyor means and (b) discharging particulate solids from said apparatus;

an entrance opening at the top of each said compartment;

recirculating passage means from said recirculating valve to said entrance opening;

fresh feed passage means from a source of fresh supply to said entrance openings; and diverter valve means in said recirculating passage and fresh feed passage to direct the inflow of particulate solids into one of said compartments.

2. Appparatus in accordance with claim 1 further comprising control means to control said diverter valve means in accordance with a predetermined program.

3. Apparatus in accordance with claim 1, wherein said compartments comprise three in number and wherein said diverter valve means comprises two separate diverter valves.

4. Apparatus in accordance with claim 3, wherein said recirculating passage means and said fresh feed passage means are coextensive and pass adjacent one another above said compartments, said diverter valve means comprising two separate valves along each of said passages.

5. Apparatus in accordance with claim 1 further comprising a solids-gas separator at each said entrance opening.

6. Apparatus in accordance with claim 1 further comprising a discharge valve at each said discharge exit.

7. A method of blending particulate solids comprising feeding fresh particulate solids to one of a series of compartments arranged in parallel for a first predetermined period while simultaneously recirculating particulate solids from all said compartments to said same one compartment;

after said first predetermined period directing the flow of fresh solids and recirculating solids to a second said compartment for a second predetermined period;

and after said second predetermined period discharging particulate solids from said compartments to use or storage.

References Cited

UNITED STATES PATENTS

| | | | |
|---|---|---|---|
| 3,106,385 | 10/1963 | Arthur et al. | 259—180 |
| 3,158,362 | 11/1964 | Seifarth | 259—4 X |
| 3,239,198 | 3/1966 | Albright et al. | 259—4 |
| 3,275,303 | 9/1966 | Goins | 259—180 X |

ROBERT W. JENKINS, *Primary Examiner.*